(12) United States Patent
Shimokawa et al.

(10) Patent No.: US 11,342,814 B2
(45) Date of Patent: May 24, 2022

(54) SENSOR MAGNET, MOTOR, AND AIR CONDITIONER

(71) Applicant: Mitsubishi Electric Corporation, Tokyo (JP)

(72) Inventors: Takaya Shimokawa, Tokyo (JP); Hiroki Aso, Tokyo (JP); Takanori Watanabe, Tokyo (JP); Ryogo Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 113 days.

(21) Appl. No.: 16/609,236

(22) PCT Filed: Jun. 29, 2017

(86) PCT No.: PCT/JP2017/023887
§ 371 (c)(1),
(2) Date: Oct. 29, 2019

(87) PCT Pub. No.: WO2019/003372
PCT Pub. Date: Jan. 3, 2019

(65) Prior Publication Data
US 2020/0336046 A1  Oct. 22, 2020

(51) Int. Cl.
*H02K 11/215* (2016.01)

(52) U.S. Cl.
CPC .................. *H02K 11/215* (2016.01)

(58) Field of Classification Search
CPC . H02K 11/215; H02K 1/2746; H02K 2213/03
USPC ....................................................... 310/68 B
See application file for complete search history.

(56) References Cited

U.S. PATENT DOCUMENTS

| 6,476,528 B2* | 11/2002 | Sekine | H02K 1/2786 |
|---|---|---|---|
| | | | 310/156.05 |
| 6,680,553 B1* | 1/2004 | Takano | H02K 3/50 |
| | | | 310/156.05 |
| 10,340,773 B2* | 7/2019 | Nishidate | H02K 21/22 |
| 2012/0043862 A1* | 2/2012 | Furukawa | H02K 1/30 |
| | | | 310/68 B |
| 2013/0106254 A1* | 5/2013 | Qi | H02K 1/146 |
| | | | 310/68 B |

(Continued)

FOREIGN PATENT DOCUMENTS

| JP | S55-076534 U | 5/1980 |
|---|---|---|
| JP | H07-123677 A | 5/1995 |

(Continued)

OTHER PUBLICATIONS

Japanese Office Action dated Feb. 2, 2021, issued in corresponding JP Patent Application No. 2019-526055 (and English Machine Translation).

(Continued)

*Primary Examiner* — John K Kim
(74) *Attorney, Agent, or Firm* — Posz Law Group, PLC (57) ABSTRACT

A sensor magnet includes a first magnetic pole part including a magnetic pole of a first polarity and a second magnetic pole part including a magnetic pole of a second polarity. A thickness of the first magnetic pole part in a direction toward a magnetic sensor is larger than a thickness of the second magnetic pole part in a direction toward the magnetic sensor.

18 Claims, 8 Drawing Sheets

(56) References Cited

U.S. PATENT DOCUMENTS

| | | | | |
|---|---|---|---|---|
| 2014/0111051 A1* | 4/2014 | Tomizawa | ............. | H02K 1/278 |
| | | | | 310/156.12 |
| 2018/0145565 A1* | 5/2018 | Pozmantir | ............ | H02K 11/215 |
| 2019/0023009 A1 | 1/2019 | Shimokawa et al. | | |
| 2019/0027980 A1* | 1/2019 | Shimokawa | ........... | H02K 29/08 |
| 2020/0336046 A1* | 10/2020 | Shimokawa | ......... | H02K 1/2746 |

FOREIGN PATENT DOCUMENTS

| | | |
|---|---|---|
| JP | 2003-052159 A | 2/2003 |
| JP | 2004-227696 A | 8/2004 |
| JP | 2005-168264 A | 6/2005 |
| JP | 2006-317336 A | 11/2006 |
| JP | 2007-252097 A | 9/2007 |
| JP | 2009-194944 A | 8/2009 |
| JP | 2012-135177 A | 7/2012 |
| JP | 2013-238485 A | 11/2013 |
| WO | 2017-046953 A1 | 3/2017 |

OTHER PUBLICATIONS

International Search Report of the International Searching Authority dated Sep. 5, 2017 for the corresponding international application No. PCT/JP2017/023887 (and English translation).

Office Action dated Jun. 16, 2020 issued in the corresponding JP application No. 2019-526055 (and English translation).

* cited by examiner

SENSOR MAGNET, MOTOR, AND AIR CONDITIONER

CROSS REFERENCE TO RELATED APPLICATION

This application is a U.S. national stage application of International Patent Application No. PCT/JP2017/023887 filed on Jun. 29, 2017, the disclosure of which is incorporated herein by reference.

TECHNICAL FIELD

The present invention relates to a sensor magnet, a motor, and an air conditioner.

BACKGROUND

In general, a motor includes a magnetic sensor for detecting a rotation position of a rotor, and a position detection magnet (also referred to as a sensor magnet) (see, for example, Patent Reference 1).

PATENT REFERENCE

Patent Reference 1: Japanese Patent Application Publication No. 2003-52159

In a conventional position detection magnet, a north pole part and a south pole part have the same shape and consequently in some cases an error in detecting a rotation position of a rotor can increase due to the influence of disturbance and other factors. In a case where the error in detecting the rotational position of the rotor is large, motor control cannot be performed accurately, and there arises a problem of a decrease in motor efficiency.

SUMMARY

It is therefore an object of the present invention to reduce a detection error in a magnetic sensor and enhance accuracy of motor control.

A sensor magnet according to an aspect of the present invention is used together with a motor including a magnetic sensor for detecting a rotation position of a rotor. The sensor magnet includes a first magnetic pole part including a magnetic pole of a first polarity and a second magnetic pole part including a magnetic pole of a second polarity. A thickness of the first magnetic pole part in a direction toward the magnetic sensor is larger than a thickness of the second magnetic pole part in the direction toward the magnetic sensor.

According to the present invention, a detection error in a magnetic sensor can be reduced and accuracy of motor control can be enhanced.

FIRST EMBODIMENT

A motor 1 according to a first embodiment of the present invention will be described.

In an xyz orthogonal coordinate system shown in each drawing, a z-axis direction (z axis) refers to a direction (hereinafter referred to as an 'axial direction') parallel to an axis line A1 of a shaft 23 of the motor 1 (i.e., rotation axis of the rotor 2), an x-axis direction (x axis) refers to a direction orthogonal to the z-axis direction (z axis), and a y-axis direction refers to a direction orthogonal to both the z-axis direction and the x-axis direction.

Figure 1:
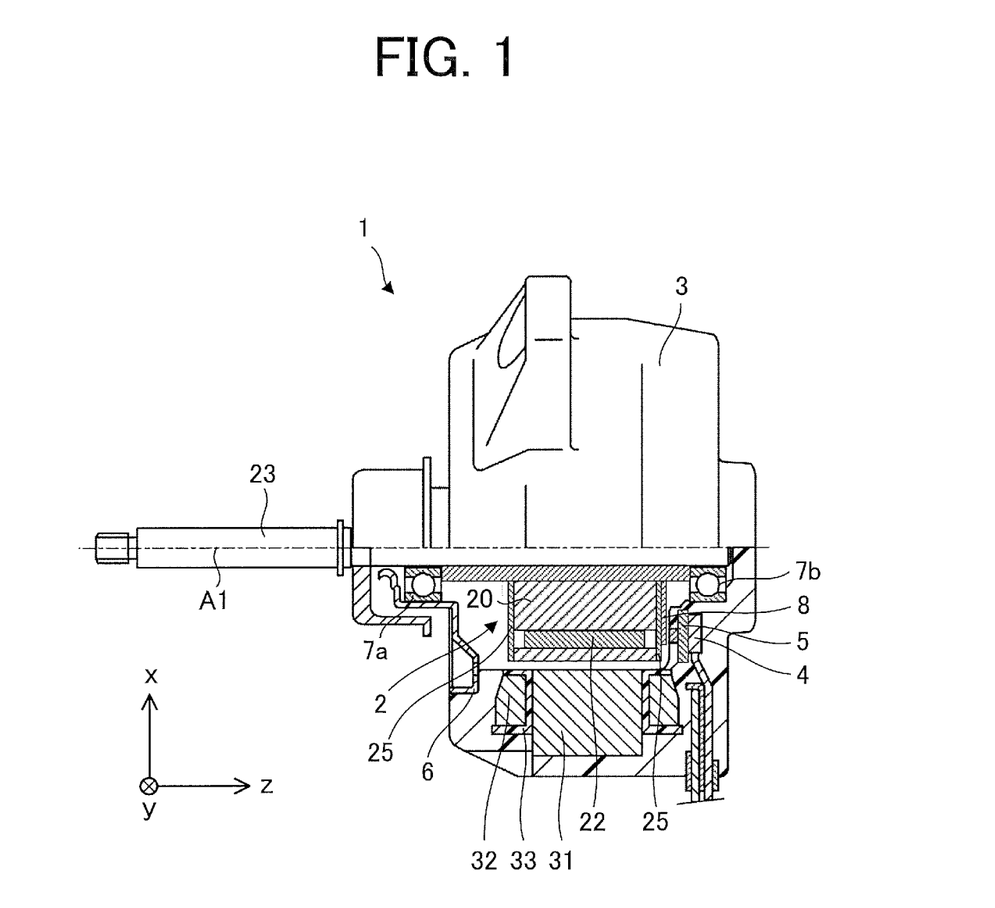
FIG. 1 is a partial cross-sectional view schematically illustrating a structure of a motor according to a first embodiment of the present invention.

FIG. 1 is a partial cross-sectional view schematically illustrating a structure of the motor 1 according to the first embodiment of the present invention.

Figure 2:
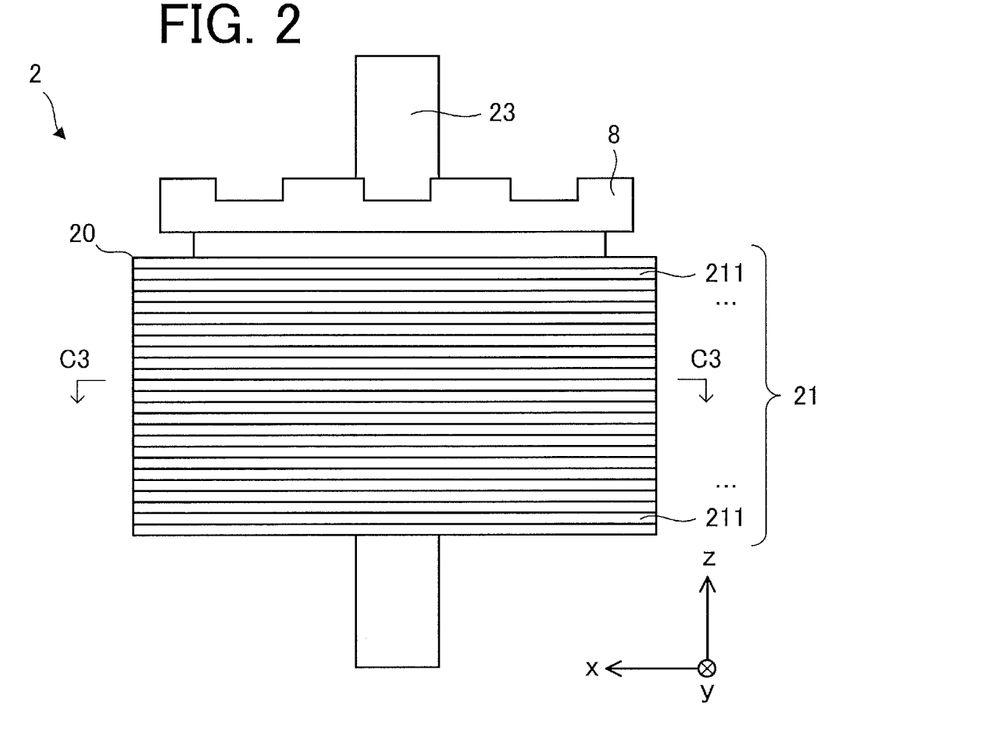
FIG. 2 is a front view schematically illustrating the structure of the motor.

FIG. 2 is a front view schematically illustrating the structure of the motor 1.

Figure 3:
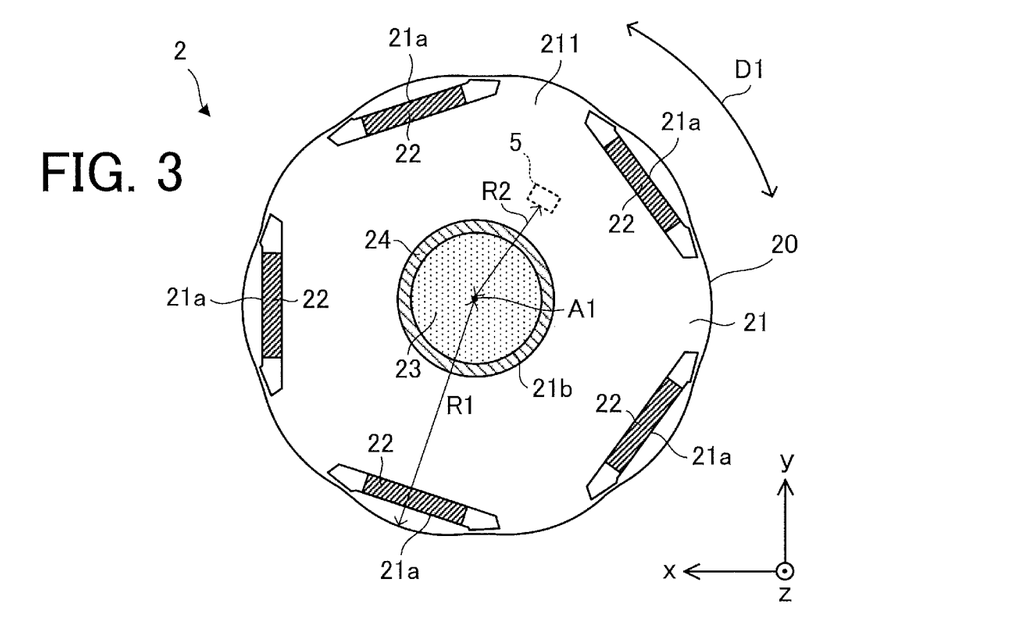
FIG. 3 is a cross-sectional view taken along line C3-C3 in FIG. 2.

FIG. 3 is a cross-sectional view taken along line C3-C3 in FIG. 2. An arrow D1 in FIG. 3 represents directions along outer circumferences of the rotor 2, a main magnet part 20, and a sensor magnet 8 (hereinafter referred to as a "circumferential direction"). A magnetic sensor 5 illustrated in FIG. 3 represents a position of the magnetic sensor 5 on the xy plane.

The motor 1 includes the rotor 2, a stator 3, a circuit board 4, the magnetic sensor 5 for detecting a rotation position of the rotor 2, a bracket 6, bearings 7a and 7b, and the sensor magnet 8 (also referred to as a position detection magnet). The motor 1 is, for example, a permanent magnet synchronous motor.

The circuit board 4 is provided on one end side of the stator 3. Electronic components such as a control circuit and the magnetic sensor 5 are mounted on the circuit board 4. The magnetic sensor 5 detects a rotation position of the sensor magnet 8, thereby detecting a rotation position of the rotor 2.

The rotor 2 includes the sensor magnet 8, the main magnet part 20, and the shaft 23. The main magnet part 20 includes a rotor core 21 and at least one permanent magnet 22 fixed to the rotor core 21. The rotation axis of the rotor 2 coincides with the axis line A1. The rotor 2 is of, for example, a permanent magnet-embedded type.

The main magnet part 20 is of a consequent pole type. That is, in this embodiment, the rotor 2 is a consequent pole type rotor.

The sensor magnet 8 is fixed to the rotor 2 (specifically, the main magnet part 20) so as to face the magnetic sensor 5. In this embodiment, the sensor magnet 8 has an annular shape. The sensor magnet 8 may have a disc shape.

In the rotor 2 that is of a consequent pole type used in this embodiment, a region between permanent magnets 22 adjacent to each other in the circumferential direction (e.g., between magnetic poles serving as north poles to the stator 3) spuriously forms the other magnetic pole (e.g., a pseudo-magnetic pole serving as a south pole to the stator 3).

The rotor 2 is provided inside the stator 3 with an air gap interposed therebetween. The bracket 6 is press-fitted in an opening at a load side of the stator 3 (load side of the motor 1). The shaft 23 is inserted in the bearing 7a, and the bearing 7a is fixed at the load side of the stator 3. Similarly, the shaft 23 is inserted in the bearing 7b, and the bearing 7b is fixed at a counter-load side of the stator 3. The rotor 2 is rotatably supported by the bearings 7a and 7b.

A center portion of the shaft 23 in the radial direction of the rotor 2 (rotor core 21) (hereinafter simply referred to as a "radial direction") is formed inside a resin part 24 in the radial direction. The shaft 23 is made of, for example, a material including nickel (Ni), chromium (Cr), or the like.

A structure of the rotor core 21 will be described.

The rotor core 21 includes at least one magnet insertion hole 21a, and a shaft insertion hole 21b that is a through hole in which the shaft 23 is inserted. In this embodiment, the rotor core 21 includes a plurality of magnet insertion holes 21a, and at least one permanent magnet 22 is inserted in each magnet insertion hole 21a.

The rotor core 21 may include a bridge portion that is a portion of a thin plate (e.g., electromagnetic steel sheet) formed between the magnet insertion holes 21a and the outer surface (outer edge) of the rotor 2. This bridge portion suppresses generation of leakage magnetic flux.

The motor 1 may be a surface permanent magnet (SPM) motor. In this case, the magnet insertion holes 21a are not formed in the rotor core 21, and the permanent magnet 22 is attached to the outer surface of the rotor core 21 in the radial direction. In addition, the motor 1 may be a reactance motor or an induction motor.

As illustrated in FIG. 1, end plates 25 for fixing the permanent magnet 22 in the axial direction may be attached to both ends of the main magnet part 20 in the axial direction. In order to fix the permanent magnet 22 in the axial direction, both sides of each magnet insertion hole 21a may be filled with a resin, instead of the end plates 25. In this case, the resin may cover the both sides of the rotor core 21.

The rotor core 21 and the shaft 23 may be integrated by caulking or with a thermoplastic resin such as PBT.

The plurality of magnet insertion holes 21a may be formed at regular intervals in the circumferential direction.

The permanent magnets 22 are rare earth magnets including neodymium (Nd) or samarium (Sm) as a main component. The permanent magnet 22 may be a ferrite magnet including iron as a main component. The permanent magnets 22 in the magnet insertion holes 21a are magnetized in the radial direction. Accordingly, magnetic flux from the main magnet part 20 flows into the stator 3.

As illustrated in FIG. 2, the rotor core 21 is formed by, for example, stacking a plurality of thin plates 211 as magnetic materials in the axial direction. The thin plates 211 are, for example, electromagnetic steel sheets. In this case, each of the thin plates 211 has a thickness of 0.2 mm to 0.5 mm. The rotor core 21 may be a resin-iron core made of a mixture of a soft magnetic material and a resin.

As illustrated in FIG. 1, the stator 3 includes a stator core 31, a coil 32, and an insulator 33. The stator 3 has an annular shape.

The stator core 31 is formed by stacking a plurality of thin plates as magnetic materials in the axial direction. For example, the stator core 31 is formed by stacking electromagnetic steel sheets including iron as a main component in the axial direction. The stator core 31 includes, for example, an annular yoke and a plurality of teeth projecting radially inward from the yoke. Each of the electromagnetic steel sheets has a thickness of 0.2 mm to 0.5 mm, for example. The stator core 31 has an annular shape.

The coil 32 is formed by, for example, winding a winding (e.g., a magnet wire) around the teeth of the stator core 31 with the insulator 33 interposed therebetween. The coil 32 is insulated by the insulator 33. The winding includes copper or aluminium as a main component.

The insulator 33 may be made of an insulating resin such as polybutyleneterephthalate (PBT), polyphenylene sulfide (PPS), liquid crystal polymer (LCP), or a polyethylene terephthalate (PET). For example, the insulator 33 is molded integrally with the stator core 31. The insulator 33 may be molded separately from the stator core 31. In this case, after the insulator 33 is molded, the insulator 33 is fitted in the stator core 31.

In this embodiment, the stator core 31, the coil 32, and the insulator 33 are covered with a thermoplastic resin (also referred to as a molding resin) such as PBT and PPS. The stator core 31, the coil 32, and the insulator 33 may be fixed by a cylindrical shell. In this case, the cylindrical shell includes iron as a main component and can cover the stator 3 together with the rotor 2 by shrink fitting.

The magnetic sensor 5 detects a rotation position of the sensor magnet 8, thereby detecting a rotation position of the rotor 2. For example, a Hall IC, a magnetoresistive (MR) element, a giant magnetoresistance (GMR) element, or a magnetic impedance element is used as the magnetic sensor 5. The magnetic sensor 5 is fixed to a position (detection position) through which magnetic flux generated from the sensor magnet 8 pass. A motor control circuit controls rotation of the rotor 2 by controlling a current flowing in the coil of the stator 3 using a detection result by the magnetic sensor 5 (e.g., a magnetic pole change point that is the boundary between the north pole and the south pole of the sensor magnet 8).

The magnetic sensor 5 detects positions (phases) of the magnetic poles of the sensor magnet 8 and the main magnet part based on a change in a magnetic field (magnetic field strength) flowing into the magnetic sensor 5. Specifically, the magnetic sensor 5 detects magnetic flux from the north pole of the sensor magnet 8 and magnetic flux flowing toward the south pole of the sensor magnet 8, thereby determining the timing (specifically, a magnetic pole change point of the sensor magnet 8) of change of the direction of the magnetic field in the circumferential direction (rotation direction) of the sensor magnet 8. North poles and south poles are alternately arranged in the circumferential direction in the sensor magnet 8, as described later. Accordingly, periodical detection of magnetic pole change points in the sensor magnet 8 with the magnetic sensor 5 makes it possible to obtain the position of each magnetic pole in the rotation direction (rotation angle and phase of the rotor 2).

Figure 4:
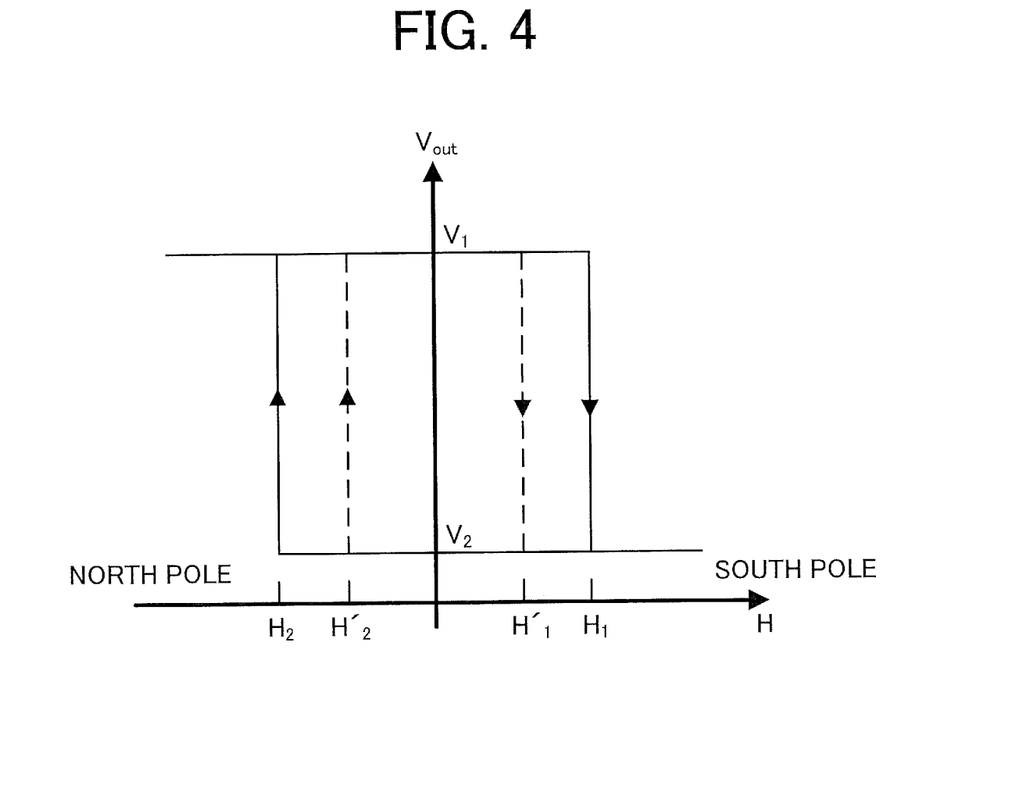
FIG. 4 is a diagram showing a relationship between a magnetic field strength H and a magnetic sensor output value $V_{out}$ with respect to a magnetic field flowing into each of two magnetic sensors having different output characteristics.

FIG. 4 is a diagram showing a relationship between a magnetic field strength H (Hall IC input magnetic field) and a magnetic sensor output value $V_{out}$ (Hall IC output) with respect to a magnetic field flowing into each of two magnetic sensors (first and second magnetic sensors) having different output characteristics. In the graph of FIG. 4, the horizontal axis represents the magnetic field strength H (input magnetic field) [N/Wb] (magnetic field strength between north pole and south pole) of a magnetic field flowing into the first and second magnetic sensors, and the vertical axis represents an output signal (specifically, voltage) $V_{out}$[V] of the magnetic sensors.

As shown in FIG. 4, the first and second magnetic sensors output binary values (signals) of a signal $V_1$ [V] and a signal $V_2$ [V]. As an example, output characteristics of the first magnetic sensor will be described. For example, in a case where the first magnetic sensor detects a magnetic field (magnetic field strength) from the north pole side toward the south pole side of the sensor magnet 8, when the first magnetic sensor detects a magnetic field at the north pole side from the sensor magnet 8, the first magnetic sensor outputs a signal $V_1$ [V]. When the magnetic field flowing into the first magnetic sensor changes and the first magnetic sensor detects a magnetic field (magnetic field strength $H_1$) at the south pole side from the sensor magnet 8, the first magnetic sensor outputs a signal $V_2$ [V]. Similarly, in a case where the first magnetic sensor detects a magnetic field (magnetic field strength) from the south pole side toward the north pole side of the sensor magnet 8, when the first magnetic sensor detects a magnetic field at the south pole side from the sensor magnet 8, the first magnetic sensor outputs a signal $V_2$ [V]. When the magnetic field flowing into the first magnetic sensor changes and the first magnetic sensor detects a magnetic field (magnetic field strength $H_2$) at the north pole side from the sensor magnet 8, the first magnetic sensor outputs a signal $V_1$ [V].

As another example, output characteristics of the second magnetic sensor will be described. For example, in a case where the second magnetic sensor detects a magnetic field (magnetic field strength) from the north pole side toward the south pole side of the sensor magnet 8, when the second magnetic sensor detects a magnetic field at the north pole side from the sensor magnet 8, the second magnetic sensor outputs a signal $V_1$ [V]. When the magnetic field flowing into the second magnetic sensor changes and the second magnetic sensor detects a magnetic field (magnetic field strength $H'_1$) at the south pole side from the sensor magnet 8, the second magnetic sensor outputs a signal $V_2$ [V]. Similarly, in a case where the second magnetic sensor detects a magnetic field (magnetic field strength) from the south pole side toward the north pole side of the sensor magnet 8, when the second magnetic sensor detects a magnetic field at the south pole side from the sensor magnet 8, the second magnetic sensor outputs a signal $V_2$ [V]. When the magnetic field flowing into the second magnetic sensor changes and the second magnetic sensor detects a magnetic field (magnetic field strength $H'_2$) at the north pole side from the sensor magnet 8, the second magnetic sensor outputs a signal $V_1$ [V].

Accordingly, as shown in FIG. 4, in some cases, the output signal of the magnetic sensor does not change instantly at the time (magnetic pole change point) when the orientation of the magnetic field flowing into the magnetic sensor switches. In addition, since the output characteristic varies among individual magnetic sensors (e.g., a difference between $H'_1$ and $H_1$), in some magnetic sensors 5, reduction in motor efficiency or noise during motor rotation may be caused due to a motor control error.

Next, a structure of the sensor magnet 8 will be described in detail.

Figure 5:
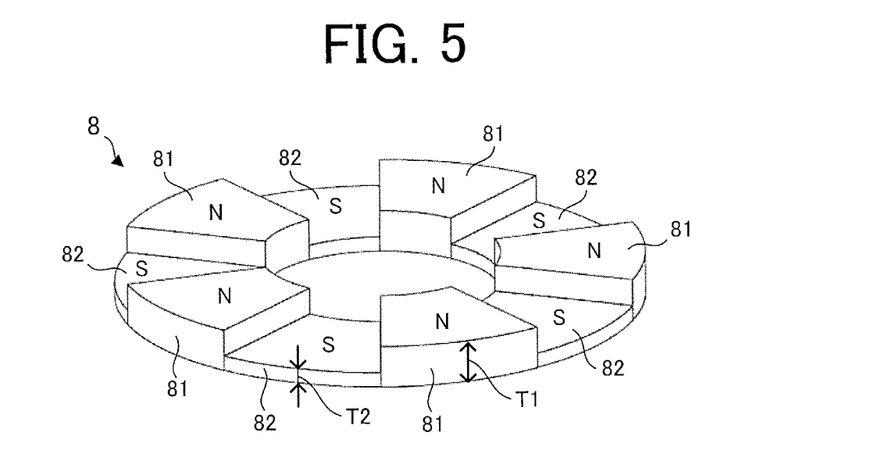
FIG. 5 is a perspective view schematically illustrating a structure of a sensor magnet.

FIG. 5 is a perspective view schematically illustrating the structure of the sensor magnet 8. The "N" shown in FIG. 5 represents the north pole, and the "S" represents the south pole.

The sensor magnet 8 is used together with the motor 1 including the magnetic sensor 5 for detecting a rotation position of the rotor 2. The sensor magnet 8 is fixed to one end side of the rotor 2 (specifically, the main magnet part 20) in the axial direction so as to face the magnetic sensor 5.

The sensor magnet 8 includes first magnetic pole parts 81 each including a magnetic pole of a first polarity and second magnetic pole parts 82 each including a magnetic pole of a second polarity. In this embodiment, the magnetic pole of the first polarity is a north pole, and the magnetic pole of the second polarity is a south pole. The magnetic pole of the first polarity may be a south pole. In this case, the magnetic pole of the second polarity is a north pole. The first magnetic pole parts 81 and the second magnetic pole parts 82 are alternately arranged in the circumferential direction. The first magnetic pole parts 81 and the second magnetic pole parts 82 have the same length in the circumferential direction.

The sensor magnet 8 is magnetized in the axial direction so that magnetic flux (magnetic flux from the first magnetic pole parts 81 in this embodiment) flows into the magnetic sensor 5. Accordingly, the magnetic sensor 5 can be attached to one end side of the stator 3 in the axial direction so as to face the sensor magnet 8.

The number of poles of the sensor magnet 8 is equal to the number of poles of the main magnet part 20. The sensor magnet 8 is positioned so that the polarity of the sensor magnet 8 coincides with the polarity of the main magnet part 20 in the circumferential direction.

A thickness T1 of each first magnetic pole part 81 in a direction toward the magnetic sensor 5 is larger than a thickness T2 of each second magnetic pole part 82 in the direction toward the magnetic sensor 5. That is, the sensor magnet 8 satisfies T2/T1<1. In other words, the thickness T1 of each first magnetic pole part 81 in a direction parallel to the axis line A1 (i.e., the rotation axis of the rotor 2) is larger than the thickness T2 of each second magnetic pole part 82 in a direction parallel to the axis line A1. In this case, the sensor magnet 8 preferably satisfies T2/T1≤0.7.

As described above, since the sensor magnet 8 satisfies T2/T1<1, a minimum distance from the first magnetic pole parts 81 to the magnetic sensor 5 is smaller than a minimum distance from the second magnetic pole parts 82 to the magnetic sensor 5. The amount of magnetic flux from the sensor magnet 8 increases or decreases in accordance with the thickness of the magnetic pole part. In addition, the amount of magnetic flux flowing into the magnetic sensor 5 is proportional to the square of the distance from the magnetic pole part to the magnetic sensor 5. Thus, the amount of magnetic flux from the sensor magnet 8 can be adjusted by changing the thicknesses T1 and T2 of the magnetic pole part. In addition, the amount of magnetic flux flowing into the magnetic sensor 5 can be adjusted by adjusting the minimum distance from the magnetic pole part to the magnetic sensor 5.

In this embodiment, the sensor magnet 8 is formed by a permanent magnet, specifically, a bonded magnet. That is, the first magnetic pole parts 81 and the second magnetic pole parts are permanent magnets, specifically, bonded magnets. Accordingly, the sensor magnet 8 having a complicated shape can be fabricated. For example, a sensor magnet satisfying T2/T1<1 as described above can be easily fabricated.

Figure 6:
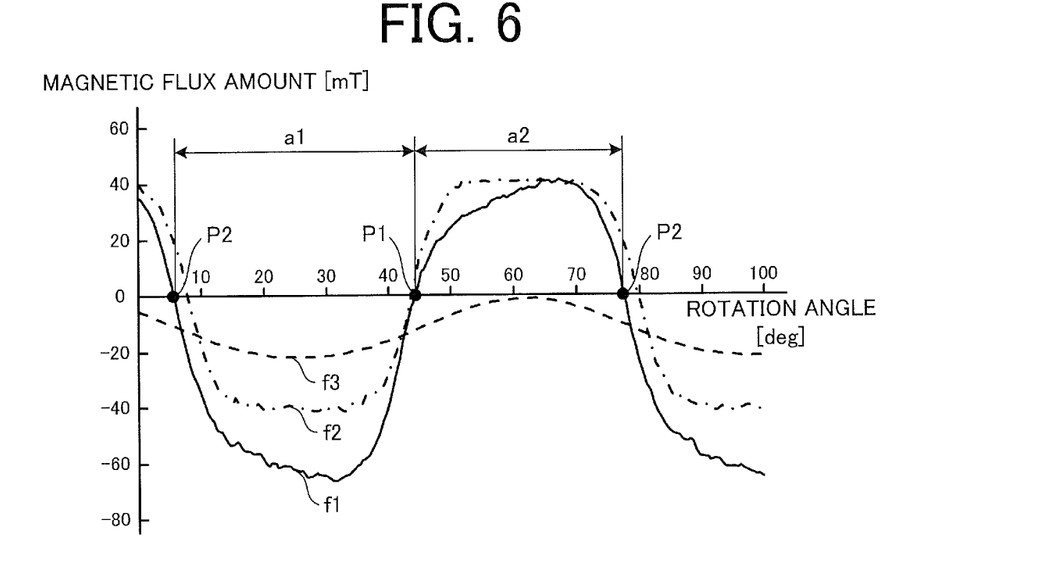
FIG. 6 is a diagram showing a change in the amount of magnetic flux flowing into a magnetic sensor in a case where a sensor magnet according to a comparative example is used in the motor.

FIG. 6 is a diagram showing a change in the amount of magnetic flux flowing into the magnetic sensor 5 (i.e., the magnetic flux amount detected by the magnetic sensor 5) in a case where a sensor magnet according to a comparative example is used in the motor 1 instead of the sensor magnet 8.

The sensor magnet according to the comparative example has a shape satisfying T1=T2. In the sensor magnet of the comparative example, the minimum distance from the north pole to the magnetic sensor 5 and the minimum distance from the south pole to the magnetic sensor 5 are equal.

In FIG. 6, f1 represents the amount of magnetic flux flowing into the magnetic sensor 5, f2 represents the amount of magnetic flux from the sensor magnet (i.e., magnetic flux amount except for disturbance) in the magnetic flux flowing into the magnetic sensor 5, and f3 represents disturbance flowing into the magnetic sensor 5. The disturbance is, for example, magnetic flux except for magnetic flux from the sensor magnet such as magnetic flux from the main magnet part 20 and magnetic flux from the stator 3. In FIG. 6, P1 represents a magnetic pole change point (position at which the south pole is switched to the north pole) detected by the magnetic sensor 5. In FIG. 6, P2 represents a magnetic pole change point (position at which the north pole is switched to the south pole) detected by the magnetic sensor 5.

In FIG. 6, a1 represents a rotation angle from the magnetic pole change point P2 to the magnetic pole change point P1, and a2 represents a rotation angle from the magnetic pole change point P1 to the magnetic pole change point P2. Specifically, a zone indicated by a1 is a zone in which the south pole side of the sensor magnet passes through the magnetic sensor 5, and a zone indicated by a2 is a zone in which the north pole side of the sensor magnet passes through the magnetic sensor 5. In this case, the magnetic sensor 5 detects magnetic pole change points at the magnetic pole change points P1 and P2, detects the south pole side in the zone a1, and detects the north pole side in the zone a2.

In the comparative example, as shown in FIG. 6, a1 is larger than a2. That is, in the sensor magnet of the comparative example, a zone in which the south pole side is detected is long, and a zone in which the north pole side is detected is short. Thus, a detection error occurs in the comparative example. In this case, reduction in motor efficiency or noise during motor rotation may be caused due to a motor control error.

Figure 7:
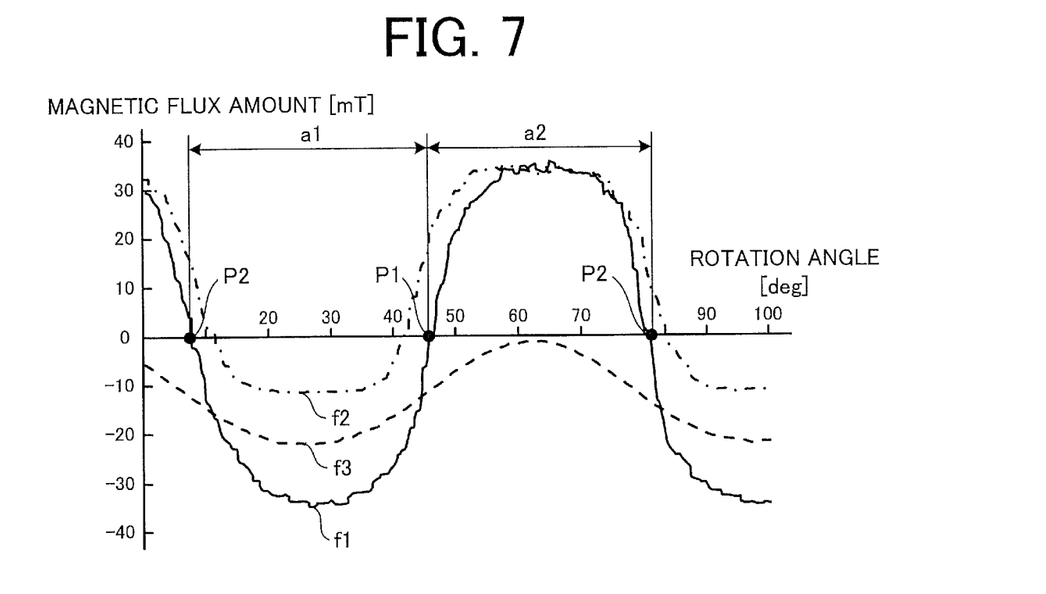
FIG. 7 is a diagram showing a change in the amount of magnetic flux flowing into the magnetic sensor in a case where the sensor magnet according to the embodiment is used in the motor.

FIG. 7 is a diagram showing a change in the amount of magnetic flux flowing into the magnetic sensor 5 (i.e., the magnetic flux amount detected by the magnetic sensor 5) in a case where the sensor magnet 8 according to this embodiment is used in the motor 1.

In FIG. 7, f1 represents the amount of magnetic flux flowing into the magnetic sensor 5, f2 represents the amount of magnetic flux from the sensor magnet 8 (i.e., magnetic flux amount except for disturbance) in the magnetic flux flowing into the magnetic sensor 5, and f3 represents disturbance flowing into the magnetic sensor 5. The disturbance is, for example, magnetic flux except for magnetic flux from the sensor magnet 8 such as magnetic flux from the main magnet part 20 and magnetic flux from the stator 3. In FIG. 7, P1 represents a magnetic pole change point (position at which the south pole is switched to the north pole) detected by the magnetic sensor 5. In FIG. 7, P2 represents a magnetic pole change point (position at which the north pole is switched to the south pole) detected by the magnetic sensor 5.

In this embodiment, as shown in FIG. 7, a1 is substantially equal to a2. That is, in the sensor magnet 8 of this embodiment, a zone in which the south pole side is detected is substantially equal to a zone in which the north pole side is detected, and the magnetic pole change points P1 and P2 are detected at substantially regular intervals. Thus, in this embodiment, a detection error is reduced, as compared to the comparative example.

The sensor magnet 8 according to this embodiment satisfies T1>T2. Accordingly, the magnetic flux amount from the first magnetic pole parts 81 (the amount of magnetic flux from the north poles in this embodiment) is larger than the amount of magnetic flux from the second magnetic pole parts 82 (the amount of magnetic flux from the south poles in this embodiment). Thus, magnetic flux from the first magnetic pole parts 81 can easily flow into the magnetic sensor 5, and the rotation angle in the zone a2 is larger than that in the comparative example. On the other hand, the rotation angle in the zone a1 is smaller than that in the comparative example. As a result, as compared to the comparative example, a balance between the magnetic flux amount at the north pole side and the magnetic flux amount at the south pole side with respect to the magnetic sensor 5 can be improved and detection errors in the magnetic sensor 5 can be reduced. Accordingly, accuracy of motor control can be enhanced.

Figure 8:
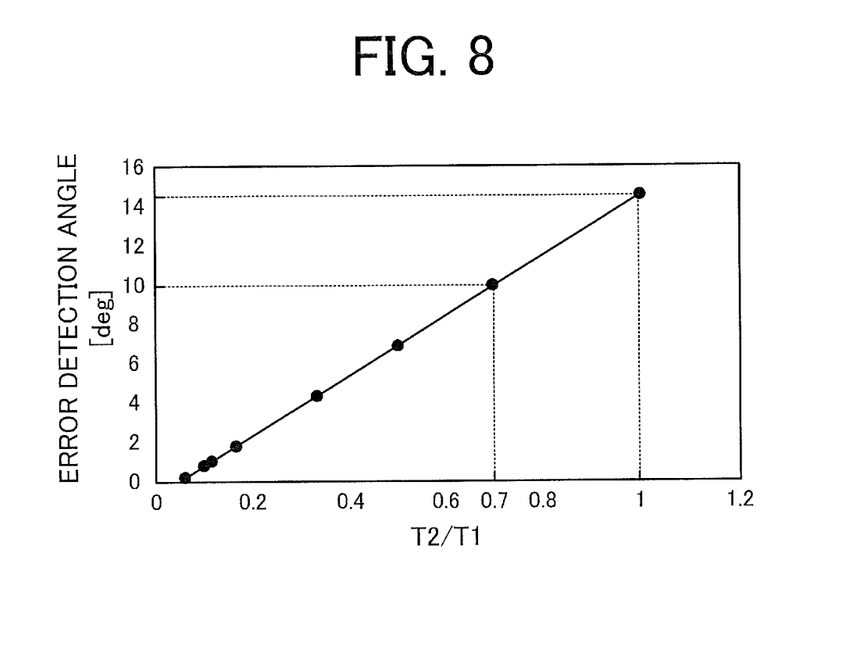
FIG. 8 is a diagram showing a relationship between an error detection angle [deg] detected by the magnetic sensor and T2/T1.

FIG. 8 is a diagram showing a relationship between an error detection angle [deg] detected by the magnetic sensor 5 and T2/T1. The error detection angle refers to a difference between an actual magnetic pole change point in the sensor magnet 8 and a rotation angle [deg] detected by the magnetic sensor 5 as a magnetic pole change point (i.e., corresponding to the magnetic pole change points P1 and P2 shown in FIGS. 6 and 7).

As shown in FIG. 8, as T2/T1 decreases, an error detection angle can be reduced, and if the sensor magnet 8 satisfies T2/T1<1, the error detection angle can be reduced not to exceed 15 [deg] that is an allowable error that allows it to hardly interfere with motor control.

In addition, if the sensor magnet 8 satisfies T2/T1≤0.7, the error detection angle can be reduced to 10 [deg] or less, and motor control can be performed more accurately. As a result, motor efficiency can be further increased.

Furthermore, as shown in FIG. 8, as T2/T1 decreases, the error detection angle can be reduced. Thus, the positions of the magnetic pole change points P1 and P2 detected by the magnetic sensor 5 can be adjusted to desirable positions by adjusting T2/T1 in accordance with characteristic of the magnetic sensor 5 or influence of disturbance, for example.

The first magnetic pole parts 81 and the second magnetic pole parts 82 are bonded magnets. Accordingly, the sensor magnet 8 having a complicated shape can be fabricated. For example, in a case where the first magnetic pole parts 81 and the second magnetic pole parts 82 are sintered magnets, it is difficult to fabricate the sensor magnet 8 satisfying T2/T1. If the first magnetic pole parts 81 and the second magnetic pole parts 82 are fabricated separately and then are bonded together, in some cases an error detection angle can increase. On the other hand, in this embodiment, since the first magnetic pole parts 81 and the second magnetic pole parts 82 are bonded magnets, the first magnetic pole parts 81 and the second magnetic pole parts 82 can be easily integrally formed, and thus, magnetic pole parts having different thicknesses can be easily formed.

Figure 9:
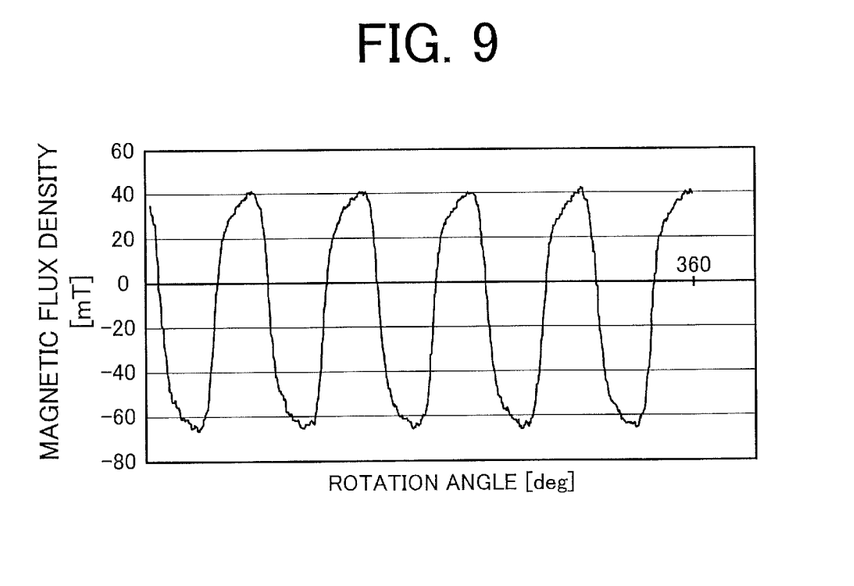
FIG. 9 is a diagram showing a change in density of magnetic flux from the sensor magnet while the rotor is rotating.

FIG. 9 is a diagram showing a change in magnetic flux density from the sensor magnet 8 while the rotor 2 is rotating. In FIG. 9, the magnetic flux density at the + side represents a north pole component, and the magnetic flux density at the − side represents a south pole component.

In this embodiment, the rotor 2 is a consequent pole type rotor. In this case, leakage magnetic flux as disturbance from the main magnet part 20 toward the magnetic sensor 5 are generated from the magnetic pole of one polarity (north poles in this embodiment). Thus, as shown in FIG. 9, an imbalance occurs between the north pole component and the south pole component of magnetic flux. In this embodiment, the positions of the magnetic pole change points P1 and P2 detected by the magnetic sensor 5 can be adjusted to desirable positions by adjusting T2/T1 as described above, and thus, this imbalance can be canceled. That is, T2/T1 is adjusted so as to cancel the imbalance, so that the error detection angle can be thereby reduced, and motor control can be improved. As a result, motor efficiency can be enhanced.

Figure 10:
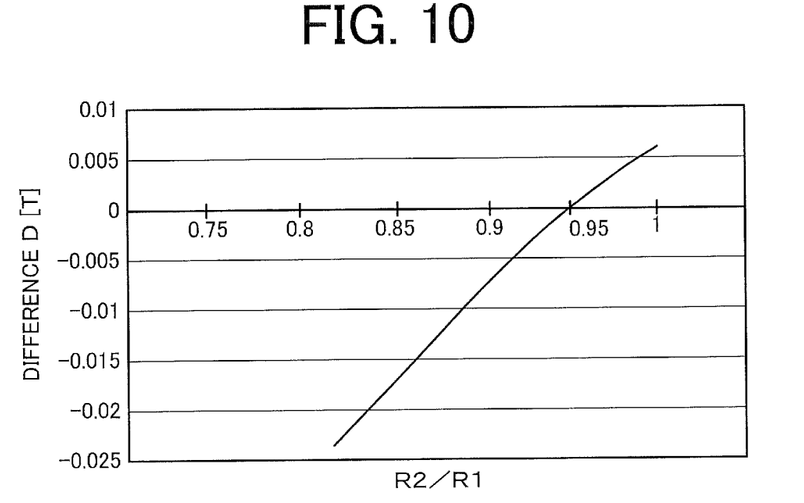
FIG. 10 is a diagram showing a relationship between a ratio R2/R1 of an installation radius R2 of the magnetic sensor to a maximum radius R1 of a main magnet part, and a difference D [T] between a north pole component and a south pole component of leakage magnetic flux.

FIG. 10 is a diagram showing a relationship between a ratio R2/R1 of an installation radius R2 of the magnetic sensor 5 (FIG. 3) to a maximum radius R1 of the main magnet part 20 (FIG. 3), and a difference D [T] (D=north pole component−south pole component) between a north pole component and a south pole component of leakage magnetic flux from the main magnet part 20. The maximum radius R1 is a radius passing through the magnetic pole part where the permanent magnet 22 is disposed (FIG. 3). The installation radius R2 is a distance from the axis line A1 to the magnetic sensor 5 (FIG. 3).

As shown in FIG. 10, if R2/R1 is 0.95 or less, the south pole component increases. That is, an imbalance occurs between the north pole component and the south pole component of magnetic flux from the main magnet part 20. Thus, if R2/R1 is 0.95 or less, the use of the sensor magnet 8 having a structure satisfying T2/T1<1 can cancel the imbalance of magnetic flux. On the other hand, if R2/R1 is larger than 0.95, the north pole component increases. In this case, the use of the sensor magnet having a structure satisfying T1/T2<1 can cancel the imbalance of magnetic flux.

First Variation

Figure 11:
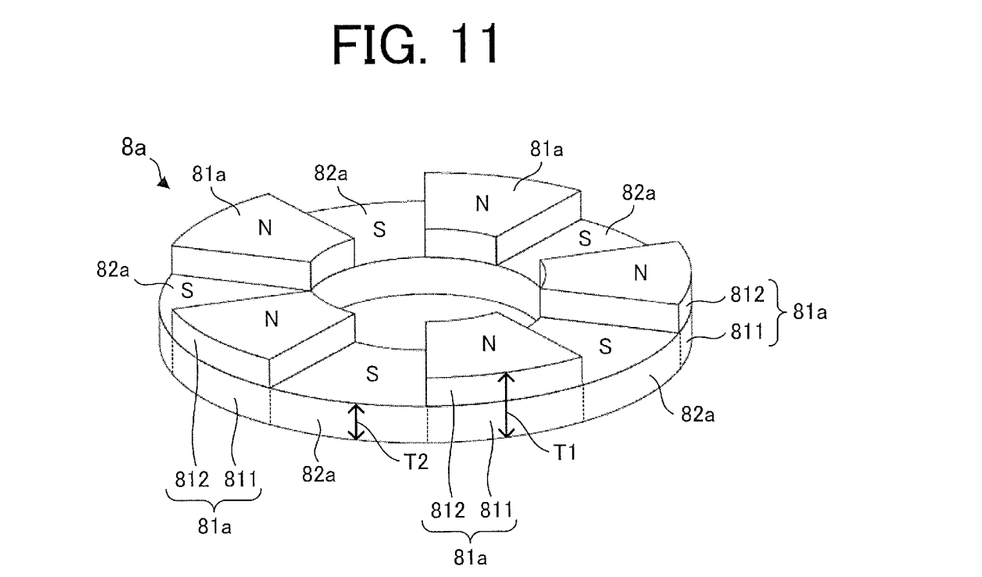
FIG. 11 is a perspective view schematically illustrating a structure of a sensor magnet according to a first variation.

FIG. 11 is a perspective view schematically illustrating a structure of a sensor magnet 8a according to a first variation.

The sensor magnet 8a includes first magnetic pole parts 81a each including a magnetic pole of a first polarity and second magnetic pole parts 82a each including a magnetic pole of a second polarity. The first magnetic pole parts 81a correspond to the first magnetic pole parts 81 of the sensor magnet 8 of the first embodiment, and the second magnetic pole parts 82a correspond to the second magnetic pole parts 82 of the sensor magnet 8 of the first embodiment. In the sensor magnet 8a of the first variation, the structure of the first magnetic pole parts 81a is different from the structure of the first magnetic pole parts 81 of the sensor magnet 8 of the first embodiment, and the other part of the structure of the sensor magnet 8a is the same as that of the sensor magnet 8.

In FIG. 11, broken lines represent boundaries between the first magnetic pole parts 81a and the second magnetic pole parts 82a.

Each of the first magnetic pole parts 81a includes a first portion 811 that is a permanent magnet, and a second portion 812 that is a soft magnetic material. The second portion 812 is provided on the surface of the first portion 811 (surface facing the magnetic sensor 5).

The sensor magnet 8a of the first variation has the same advantages as those of the sensor magnet 8 of the first embodiment.

In addition, the second portion 812 as the soft magnetic material is attached to the surface of the first portion 811 as the permanent magnet, so that a permeance coefficient can be increased. Accordingly, the amount of magnetic flux from the first magnetic pole parts 81a is increased as compared to the amount of magnetic flux from the second magnetic pole parts 82a. That is, the second portion 812 is used to adjust the positions of the magnetic pole change points P1 and P2 detected by the magnetic sensor 5 to desirable positions in accordance with characteristics of the magnetic sensor 5 or the influence of disturbance, for example.

Second Variation

Figure 12:
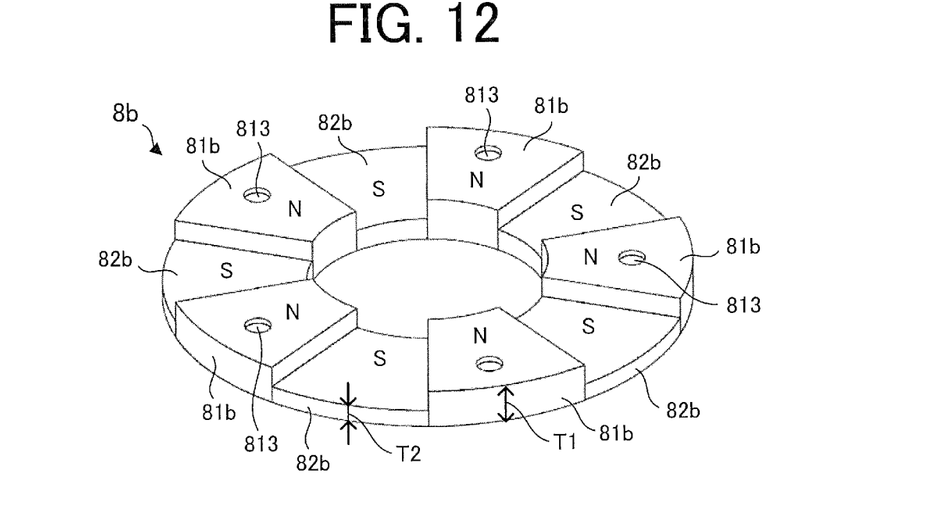
FIG. 12 is a perspective view schematically illustrating a structure of a sensor magnet according to a second variation.

FIG. 12 is a perspective view schematically illustrating a structure of a sensor magnet 8b according to a second variation.

The sensor magnet 8b includes first magnetic pole parts 81b each including a magnetic pole of a first polarity and second magnetic pole parts 82b each including a magnetic pole of a second polarity. The first magnetic pole parts 81b correspond to the first magnetic pole parts 81 of the sensor magnet 8 of the first embodiment, and the second magnetic pole parts 82b correspond to the second magnetic pole parts 82 of the sensor magnet 8 of the first embodiment. In the sensor magnet 8b of the second variation, the structure of the first magnetic pole parts 81b is different from the structure of the first magnetic pole parts 81 of the sensor magnet 8 of the first embodiment, and the other part of the structure of the sensor magnet 8b is the same as that of the sensor magnet 8.

Each of the first magnetic pole parts 81b has a recess 813 formed in the surface facing the magnetic sensor 5. The recess 813 may be formed in the surface of each of the second magnetic pole parts 82b. The recess 813 only needs to be formed at such a position that can maintain the strength of the sensor magnet 8b, and may be formed at a position other than the position facing the magnetic sensor 5.

The recess 813 is formed in, for example, a magnetic pole center (center of the north pole in this embodiment). Since the magnetic sensor 5 detects a magnetic pole change point, even if the recess 813 is formed at the magnetic pole center, no problems occur in a detection result of the magnetic sensor 5. The recess 813 may be a through hole.

The sensor magnet 8b of the second variation has the same advantages as those of the sensor magnet 8 of the first embodiment.

In addition, the recess 813 formed in the surface of each of the first magnetic pole parts 81b can reduce a material for the sensor magnet 8b (i.e., a material for the permanent magnet). Accordingly, costs for the sensor magnet 8b can be reduced, and the weight of the sensor magnet 8b can be reduced.

Third Variation

Figure 13:
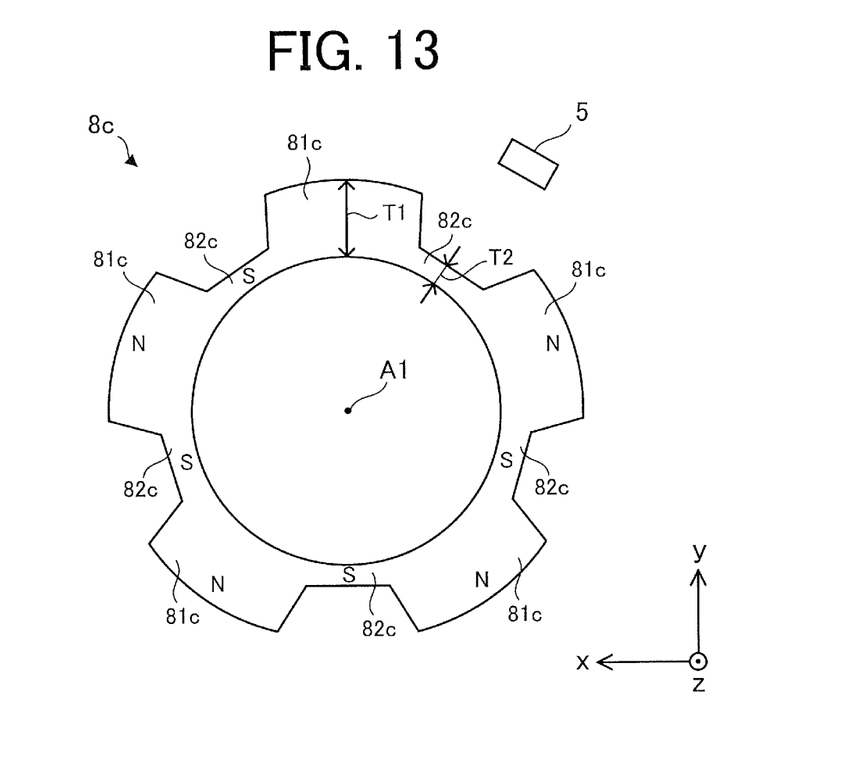
FIG. 13 is a plan view schematically illustrating a structure of a sensor magnet according to a third variation.

FIG. 13 is a plan view schematically illustrating a structure of a sensor magnet 8c according to a third variation.

The sensor magnet 8c includes first magnetic pole parts 81c each including a magnetic pole of a first polarity and second magnetic pole parts 82c each including a magnetic pole of a second polarity. The first magnetic pole parts 81c correspond to the first magnetic pole parts 81 of the sensor magnet 8 of the first embodiment, and the second magnetic pole parts 82c correspond to the second magnetic pole parts 82 of the sensor magnet 8 of the first embodiment. Although the sensor magnet 8 of the first embodiment is magnetized in the axial direction, the sensor magnet 8c of the third variation is magnetized in the radial direction. The other part of the structure of the sensor magnet 8c is the same as that of the sensor magnet 8.

In the sensor magnet 8c of the third variation, a thickness T1 of each first magnetic pole part 81c and a thickness T2 of each second magnetic pole part 82c are thicknesses in the radial direction. In this case, the sensor magnet 8c also satisfies T2/T1<1. In addition, as described in the first embodiment, the sensor magnet 8c preferably satisfies T2/T1≤0.7.

The sensor magnet 8c of the third variation has the same advantages as those of the sensor magnet 8 of the first embodiment.

SECOND EMBODIMENT

An air conditioner 10 according to a second embodiment of the present invention will be described.

Figure 14:
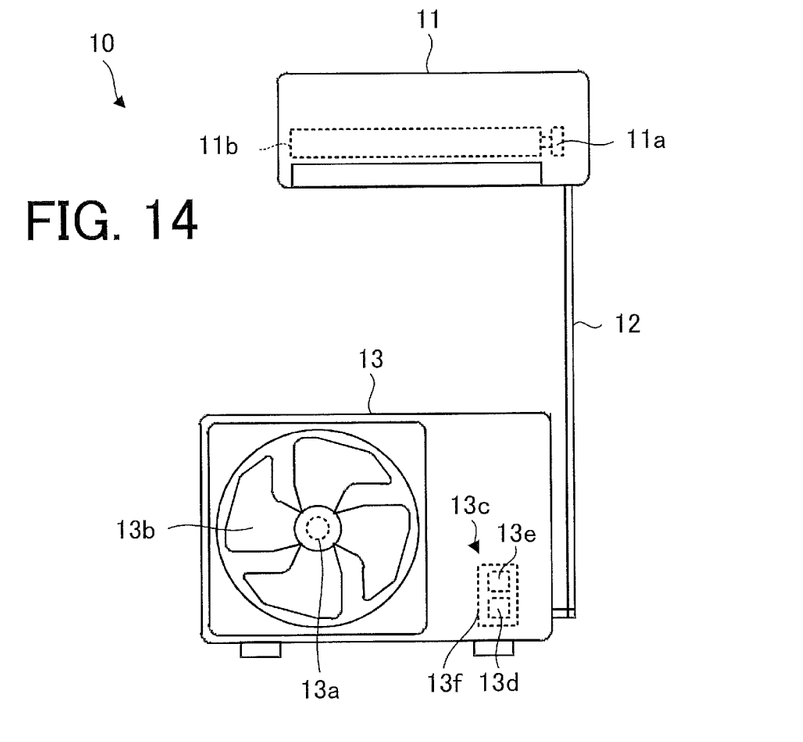
FIG. 14 is a diagram schematically illustrating a configuration of an air conditioner according to a second embodiment of the present invention.

FIG. 14 is a diagram schematically illustrating a configuration of the air conditioner 10 according to the second embodiment of the present invention.

Figure 15:
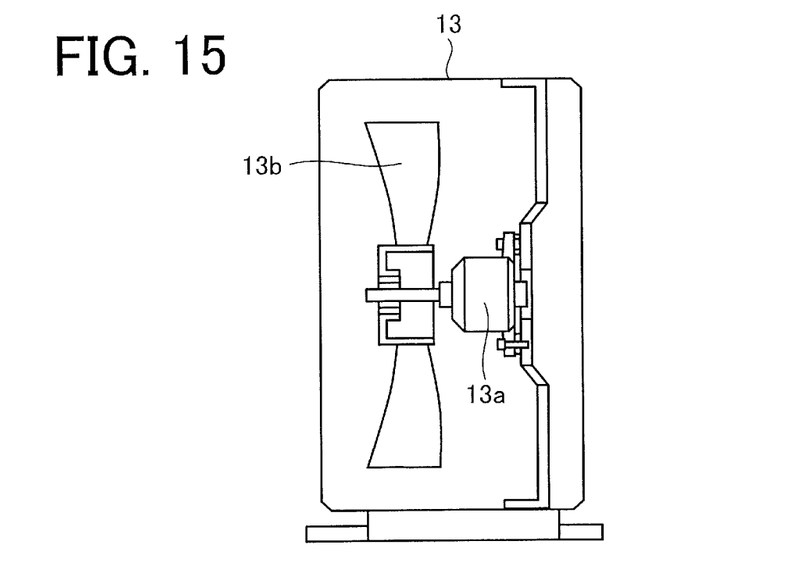
FIG. 15 is a diagram schematically illustrating main components in an outdoor unit of the air conditioner.

FIG. 15 is a diagram schematically illustrating main components in an outdoor unit 13 of the air conditioner 10.

The air conditioner 10 of the second embodiment includes an indoor unit 11, a refrigerant pipe 12, and the outdoor unit 13 connected to the indoor unit 11 by the refrigerant pipe 12.

The indoor unit 11 includes a motor 11a and an air blower 11b (also referred to as an air blower for the indoor unit). The outdoor unit 13 includes a motor 13a, a fan 13b as an air blower (also referred to as an air blower for the outdoor unit), a compressor 13c, and a heat exchanger (not shown). The compressor 13c includes a motor 13d (e.g., the motor 1 of the first embodiment), a compression mechanism 13e (e.g., a refrigerant circuit) driven by the motor 13d, and a housing 13f accommodating the motor 13d and the compression mechanism 13e.

In the air conditioner 10 of the second embodiment, at least one of the indoor unit 11 or the outdoor unit 13 includes the motor 1 described in the first embodiment. Specifically, the motor 1 described in the first embodiment is applied to at least one of the motors 11a and 13a as a driving source of the air blower. In addition, the motor 1 described in the first embodiment may be used as the motor 13d of the compressor 13c.

The air conditioner 10 can perform an operation such as a cooling operation of sending cool air from the indoor unit 11 or a heating operation of sending warm air from the indoor unit 11. In the indoor unit 11, the motor 11a is a driving source for driving the air blower 11b. The air blower 11b can send conditioned air.

As illustrated in FIG. 15, in the outdoor unit 13, the motor 13a is a driving source for driving the fan 13b. The motor 13a is fixed to a casing of the outdoor unit 13 with screws, for example. A shaft of the motor 13a is coupled to the fan 13b. The fan 13b rotates by driving the motor 13a.

In the air conditioner 10 of the second embodiment, since the motor 1 described in the first embodiment is applied to at least one of the motors 11a and 13a, the same advantages as those described in the first embodiment can be obtained.

In addition, in the second embodiment, the compressor 13c and the air conditioner 10 having high operating efficiency can be provided.

The motor 1 described in the first embodiment can be mounted on equipment including a driving source, such as a ventilator, a home appliance, or a machine tool, in addition to the air conditioner 10.

Features of the embodiments and features of the variations described above can be combined as appropriate.

What is claimed is:

1. A motor comprising:
a stator;
a rotor provided inside the stator; and
a magnetic sensor to detect a rotation position of the rotor, wherein
the rotor includes:
a main magnet part; and
a sensor magnet fixed to the main magnet part so as to face the magnetic sensor,
the sensor magnet includes:
a first magnetic pole part including a magnetic pole of a first polarity, the first magnetic pole part including a first permanent magnet; and
a second magnetic pole part including a magnetic pole of a second polarity, the second magnetic pole part being a second permanent magnet,
a thickness of the first magnetic pole part in a direction toward the magnetic sensor is larger than a thickness of the second magnetic pole part in the direction toward the magnetic sensor, and
the second magnetic pole part is adjacent to the first magnetic pole part in a circumferential direction of the sensor magnet, wherein
the motor satisfies R2/R1 ≤0.95 and T2/T1 <1, where R1 is a maximum radius of the main magnet part, R2 is a distance from a rotation axis of the rotor to the magnetic sensor, T1 is the thickness of the first magnetic pole part, and T2 is the thickness of the second magnetic pole part.

2. The sensor magnet according to claim 1, wherein a minimum distance from the first magnetic pole part to the magnetic sensor is smaller than a minimum distance from the second magnetic pole part to the magnetic sensor.

3. The sensor magnet according to claim 1, wherein the first magnetic pole part and the second magnetic pole part are bonded magnets.

4. The sensor magnet according to claim 1, wherein
the first magnetic pole part includes
a first portion that is the first permanent magnet, and
a second portion that is provided on a surface of the first portion and is a soft magnetic material.

5. The sensor magnet according to claim 1, wherein the first magnetic pole part has a recess formed in a surface of the first magnetic pole part, the surface facing the magnetic sensor.

6. The sensor magnet according to claim 1, wherein T2/T1 ≤0.7 is satisfied, where T1 is the thickness of the first magnetic pole part and T2 is the thickness of the second magnetic pole part.

7. The sensor magnet according to claim 1, wherein the first magnetic pole part and the second magnetic pole part are magnetized in a radial direction.

8. The motor according to claim 1, wherein
the main magnet part includes:
a rotor core; and
a third permanent magnet fixed to the rotor core, and
the main magnet part is of a consequent pole type.

9. The motor according to claim 1, wherein the sensor magnet is magnetized in an axial direction.

10. An air conditioner comprising:
an indoor unit; and
an outdoor unit connected to the indoor unit, wherein
at least one of the indoor unit or the outdoor unit includes a motor,
the motor includes:
a stator;
a rotor provided inside the stator; and
a magnetic sensor to detect a rotation position of the rotor,
the rotor includes:
a main magnet part; and
a sensor magnet fixed to the main magnet part so as to face the magnetic sensor,
the sensor magnet includes:
a first magnetic pole part including a magnetic pole of a first polarity, the first magnetic pole part including a first permanent magnet; and
a second magnetic pole part including a magnetic pole of a second polarity, the second magnetic pole part being a second permanent magnet,
a thickness of the first magnetic pole part in a direction toward the magnetic sensor is larger than a thickness of the second magnetic pole part in the direction toward the magnetic sensor, and
the second magnetic pole part is adjacent to the first magnetic pole part in a circumferential direction of the sensor magnet, wherein
the motor satisfies R2/R1 ≤0.95 and T2/T1 <1, where R1 is a maximum radius of the main magnet part, R2 is a distance from a rotation axis of the rotor to the magnetic sensor, T1 is the thickness of the first magnetic pole part, and T2 is the thickness of the second magnetic pole part.

11. The air conditioner according to claim 10, wherein a minimum distance from the first magnetic pole part to the magnetic sensor is smaller than a minimum distance from the second magnetic pole part to the magnetic sensor.

12. The air conditioner according to claim 10, wherein the first magnetic pole part and the second magnetic pole part are bonded magnets.

13. The air conditioner according to claim 10, wherein the first magnetic pole part includes
a first portion that is the first permanent magnet, and
a second portion that is provided on a surface of the first portion and is a soft magnetic material.

14. The air conditioner according to claim 10, wherein the first magnetic pole part has a recess formed in a surface of the first magnetic pole part, the surface facing the magnetic sensor.

15. The air conditioner according to claim 10, wherein T2/T1 ≤0.7 is satisfied, where T1 is the thickness of the first magnetic pole part and T2 is the thickness of the second magnetic pole part.

16. The air conditioner according to claim 10, wherein the first magnetic pole part and the second magnetic pole part are magnetized in a radial direction.

17. The air conditioner according to claim 10, wherein the sensor magnet is magnetized in an axial direction.

18. The air conditioner according to claim 10, wherein the main magnet part includes:
a rotor core; and
a third permanent magnet fixed to the rotor core, and
the main magnet part is of a consequent pole type.

* * * * *